US011835455B2

United States Patent
Yang et al.

(10) Patent No.: US 11,835,455 B2
(45) Date of Patent: Dec. 5, 2023

(54) ATOMIC FLUORESCENCE ANALYSIS METHOD AND DEVICE USING WATER AS CARRIER FLUID

(71) Applicant: Chongqing Mintai New Agrotech Development Group Co., Ltd., Chongqing (CN)

(72) Inventors: Mei Yang, Chongqing (CN); Zhixiang Gong, Chongqing (CN); Hui Gong, Shanghai (CN)

(73) Assignee: CHONGQING MINTAI NEW AGROTECH DEVELOPMENT GROUP CO., LTD., Chongqing (CN)

( * ) Notice: Subject to any disclaimer, the term of this patent is extended or adjusted under 35 U.S.C. 154(b) by 0 days.

(21) Appl. No.: 17/286,617

(22) PCT Filed: Apr. 25, 2019

(86) PCT No.: PCT/CN2019/084308
§ 371 (c)(1),
(2) Date: Apr. 19, 2021

(87) PCT Pub. No.: WO2020/087893
PCT Pub. Date: May 7, 2020

(65) Prior Publication Data
US 2021/0364435 A1    Nov. 25, 2021

(30) Foreign Application Priority Data

Oct. 29, 2018 (CN) .......................... 201811270608.0
Oct. 29, 2018 (CN) .......................... 201821763422.4

(51) Int. Cl.
*G01N 21/64* (2006.01)
*G01N 1/14* (2006.01)

(52) U.S. Cl.
CPC ........... *G01N 21/6404* (2013.01); *G01N 1/14* (2013.01); *G01N 2001/149* (2013.01); *G01N 2001/1463* (2013.01)

(58) Field of Classification Search
CPC ................. G01N 21/6404; G01N 1/14; G01N 2001/1463; G01N 2001/149;
(Continued)

(56) References Cited

U.S. PATENT DOCUMENTS

2012/0224175 A1    9/2012 Minghetti

FOREIGN PATENT DOCUMENTS

CN    205958459 U    2/2017
CN    107389547 A    11/2017
(Continued)

OTHER PUBLICATIONS

International Search Report dated Jul. 19, 2019 issued in PCT/CN2019/084308.
(Continued)

*Primary Examiner* — Robert R Raevis
(74) *Attorney, Agent, or Firm* — Scully, Scott, Murphy & Presser, P.C.

(57) ABSTRACT

The invention discloses an atomic fluorescence analysis method and device using water as a carrier fluid, belonging to the atomic fluorescence analysis in the field of analytical chemistry; the method is to replace hydrochloric acid and a reducing agent with water as the carrier fluid in the conventional sampling and fluid delivery process to carry the test liquid and reagent into the reactor to complete a reaction. The invention effectively overcomes the memory effect by using water as the carrier fluid and improves the determination sensitivity and accuracy, which saves a large amount of high-purity hydrochloric acid and reducing agent at the same time, greatly reducing the analysis cost, and signifi-
(Continued)

cantly improving the operating environment, which is the innovation of atomic fluorescence analysis technology.

10 Claims, 3 Drawing Sheets

(58) Field of Classification Search
CPC ....... G01N 21/6402; G01N 2021/6406; G01N 2021/3572
USPC ........... 73/863, 1.02, 1.03, 864.81; 422/68.1, 422/82.05–82.8
See application file for complete search history.

(56) References Cited

FOREIGN PATENT DOCUMENTS

| | | |
|---|---|---|
| CN | 107561050 A | 1/2018 |
| JP | S60102542 A | 6/1985 |
| JP | S617467 A | 1/1986 |
| JP | 2012058128 A | 3/2012 |
| JP | 2016070727 A | 5/2016 |

OTHER PUBLICATIONS

Semenova, N. V., et al., "Sequential injection analysis system for total inorganic arsenic determination by hydride generation-atomic fluorescence spectrometry", Analytica Chimica Acta, May 2000, pp. 169-175, 412.

Ming-Li, C., et al., "Hydride Generation-Atomic Fluorescence Spectrometric Determination of Cadmium in Pure Copper", Chinese Journal of Analytical Chemistry, Sep. 2007, 5 pages, vol. 35, Issue 9.

Extended European Search Report dated May 23, 2022 received in European Patent Application No. 19880388.4, 8 pages.

English-language translation of the Japanese Office Action dated Jul. 4, 2023, received in Japanese Application No. 2021-523271, 12 pages.

ATOMIC FLUORESCENCE ANALYSIS METHOD AND DEVICE USING WATER AS CARRIER FLUID

FIELD OF THE INVENTION

The present invention belongs to the field of analytical chemistry, and relates to atomic fluorescence analysis, in particular to the improvement of existing atomic fluorescence analysis methods and atomic fluorometer.

BACKGROUND OF THE INVENTION

Atomic fluorescence analysis has been widely used in the determination of trace elements As, Sb, Bi, Hg, Se, etc. The basic principle is that the ions of the element to be tested in an acidic medium (usually hydrochloric acid) is reacted with a strong reducing agent (usually potassium borohydride or sodium borohydride) and is reduced to gaseous hydride or Hg atoms, while generating a large amount of hydrogen gas. Hydride molecules are dissociates into ground state atoms in a high-temperature hydrogen flame. The atoms are excited to a high energy state by radiation of a specific frequency from the excitation light source. Since the high energy level is extremely unstable, the excited state atoms emit fluorescence with a characteristic wavelength in the form of light radiation during the de-excitation process. The fluorescence intensity is related to the concentration of the element to be tested, and the fluorescence signal is determined by a detector (usually a photomultiplier tube) to obtain the concentration of the element to be tested.

The atomic fluorescence analysis device (also called atomic fluorometer, atomic fluorescence photometer) designed according to the above principles mainly includes several parts of a fluid delivery system, a vapor generation system (or called a reactor), an atomizer, an excitation light source and a determination system. The test solution and reducing agent are delivered through the fluid delivery system and carried into the reactor by the carrier liquid (also called carrier fluid) to undergo a chemical reaction to generate gaseous Hg atoms or hydride molecules and hydrogen (collectively referred to as "vapors"), which enter the atomizer under a carrier gas (usually argon).

The carrying of test solution and reagent (reducing agent) has always used HCl and $NaBH_4$ (or $KBH_4$) as the carrier liquid. This technology has the following defects: there is a serious memory effect in the fluid delivery system; especially after measuring high concentration samples, the next sample cannot be determined until the blank solution is required to wash for many times, which takes a long time and even requires a complete replacement of the fluid delivery system. Continuous use of a large amount of acid carrier liquid not only brings pollution to the operating environment, but also corrodes the instrument. At the same time, in the carrying process it consumes a large amount of high-purity HCl and expensive reducing agents, which also increases the cost of testing.

SUMMARY OF THE INVENTION

An object of the present invention is to provide an atomic fluorescence analysis method and an analysis device using water as the carrier fluid to effectively solve the above-mentioned problems in atomic fluorescence analysis.

One aspect of the present invention provides an atomic fluorescence analysis method using water as a carrier fluid, which includes the steps of sampling and fluid delivery, making the test solution and reagent react in a reactor, atomizing the test element(s), and determining fluorescence. The characteristic is: in the process of sampling and fluid delivery, water is used to replace HCl and reducing agent as the carrier fluid, and carries the test solution and reagent into the reactor to complete the reaction, wherein the reagent is the reducing agent.

Specifically, the sampling and fluid delivery process is sampling first—that is, introducing a test solution with a certain acidity and a reagent with a certain concentration at the same time, and then is fluid delivery—that is, carrying the test solution and the reagent into the reactor with pure water as the carrier fluid.

The above-mentioned sampling time is 4-5 seconds, and the time from fluid delivery to completion of the determination is 8-10 seconds.

The acidity of the above test solution is related to the element to be tested. The acidity of the test solution is adjusted by hydrochloric acid. The concentration of hydrochloric acid in the test solution ranges from 4% to 10%; the relationship between the concentration and the acidity of the common test element solution is as shown in Table 1.

TABLE 1

Relationship Between Concentration and Acidity of Common Test Element Solution

| Element | As | Sb | Bi | Se | Hg | Pb | Cd |
|---|---|---|---|---|---|---|---|
| Concentration (ng/ml) | 1-50 | 1-10 | 1-10 | 1-50 | 0.1-2 | 2-25 | 0.05-2 |
| HCl (%) | 10 | 10 | 10 | 10 | 5-10 | 10 | 4 |

Another aspect of the present invention provides an atomic fluorescence analysis device using water as a carrier fluid, including a fluid delivery system, a reactor, an atomizer, an excitation light source, and a detector, etc., characterized in that: the fluid delivery system includes: a test solution bottle containing the sample solution to be tested, which is connected to the reactor through a sample inlet tube; a reagent bottle used to contain the reducing agent, which is connected to the reactor through a reagent inlet tube; a water bottle containing pure water, the water bottle outlets are connected to the inlet of the sample inlet tube and the inlet of the reagent inlet tube through two water inlet tubes, and a switch is configured to control the water intake from the water inlet tube to the sample inlet tube or the reagent inlet tube; and said fluid delivery system does not contain supporting devices for injecting carrier acid.

Based on the above device, the present invention further provides an atomic fluorescence analysis method using water as the carrier fluid, which includes the following steps:

Step 1. Preparing a series of standard solutions with different concentrations of the element to be tested, sample solution and $NaBH_4$ solution. The standard solutions or the sample solution is put into the test solution bottle and the $NaBH_4$ solution used as the reducing agent is put into the reagent bottle; the pure water is put into the water bottle.

Step 2. Making a Standard Curve:
1) sampling: connecting the sample inlet tube to the inlet of the test solution bottle containing standard blank solution, and connecting the reagent inlet tube to the inlet of the reagent bottle;
2) fluid delivery: turning on the switch to connect the sample inlet tube and the reagent inlet tube with the water inlet tube to make the pure water in the water bottle enter the sample inlet tube and the reagent inlet tube, and carry and push the standard blank solution and NaBH$_4$ solution into the reactor respectively;
3) determining: making the reactor, the atomizer and the excitation light source work; and obtaining a blank fluorescence value by the detector;
4) replacing the test solution bottles containing the series of standard solutions with different concentrations in the order of concentration from low to high; repeating steps 1)-3), and sequentially determining and obtaining the fluorescence value of each standard solution;
5) drawing a fluorescence value-concentration standard curve;

Step 3. Sample determination: replacing the test solution bottle containing the sample solution; repeating 1)-3) in Step 2 to determine and obtain the corresponding fluorescence value of the sample solution, and obtaining the concentration of the element(s) to be tested in the sample solution via the fluorescence value-concentration standard curve.

Wherein: the sampling time in step 1) is 4-5 seconds; the time from the fluid delivery in step 2) to obtaining the fluorescence value by the detector in step 3) is 8-10 seconds.

Based on the above atomic fluorescence analysis device using water as the carrier fluid, the present invention further provides a simplified atomic fluorescence analysis device using water as the carrier fluid. In this simplified device, the sample inlet tube and the reagent inlet tube are both liquid inlet capillary tubes, and the water bottle is changed into two water cups. One of the water cups is used for water for cleaning, while the other is used for water for carrier fluid. The liquid inlet head ends of the two liquid inlet capillary tubes can be alternately inserted into two glasses of water.

Specifically, two liquid inlet capillary tubes are connected to the reactor through a peristaltic pump, and the peristaltic pump controls the delivery speed and the delivery volume of the test solution, reagent and water for carrier fluid in the liquid inlet capillary tubes.

Based on this simplified device, the present invention also provides a matched atomic fluorescence analysis method using water as the carrier fluid, including the following operations:

Operation 1. Preparing a series of standard solutions with different concentrations of the element to be tested, sample solution and NaBH$_4$ solution as required, and preparing two cups of pure water;
Operation 2. Initiating the atomic fluorometer and adjusting it to the required working state;
Operation 3. Making a standard curve:
A1) sampling: inserting the liquid inlet head ends of the two liquid inlet capillary tubes into the standard blank solution and NaBH$_4$ solution for sampling respectively, and the peristaltic pump stops working after 4-5 seconds;
A2) replacing insertion: taking out the liquid inlet head ends of the two liquid inlet capillary tubes and placing them in a cup of cleaning water for cleaning, and then transferring them to the water for carrier fluid in the other cup; and re-initiating the peristaltic pump;
A3) carrier fluid determination: carrying the standard blank solution and NaBH$_4$ solution into the reactor by the carrier fluid, respectively, and obtaining the blank fluorescence value by the detector;
A4) replacing the standard blank solution with the series of standard solutions of different concentrations in the order of concentration from low to high; repeating A1)-A3), and sequentially determining and obtaining the fluorescence value of each standard solution;
A5) drawing a fluorescence value-concentration standard curve; Operation 4. Sample determination: replacing the standard blank solution with the sample solution; determining and obtaining the fluorescence value of the sample solution according to Operations A1)-A3); obtaining the concentration of the element to be tested in the sample solution from the fluorescence value-concentration standard curve, and entering the relevant parameters to calculate the content of the determined element in the sample.

In the above Operation 3, the sampling/delaying/replacing insertion/determination time is 4-5/0/2-3/8-10 seconds respectively, wherein the delaying is the operation after sampling, that is, the sampling time is 4-5 seconds in A1), the delaying time is zero second, the replacing insertion time is 2-3 in A2), while the carrier fluid determination time is 8-10 seconds in A3).

By adopting the above solution, the present invention creatively uses water as the carrier fluid in the process of atomic fluorescence analysis, ending the 30-year history of using HCl and NaBH$_4$ as the carrier fluid. It has been proved in examples: by applying the fluid delivery technology of using water for replacing HCl and reducing agents as the carrier fluid into atomic fluorescence analysis, it not only can determine microscale or trace amounts of As, Sb, Bi, Pb, Se, Cd, Hg, etc. in the test solution, but also overcomes the technical bias that it is impossible to use water as a carrier fluid in atomic fluorescence analysis in the common understanding. At the same time, unlike HCl and NaBH$_4$ as carrier fluid, ultrapure water does not contain the component to be tested, and will not undergo any chemical reaction with the test solution or the reducing agents during fluid delivery process, let alone a large amount of bubbles (caused by the hydrogen produced by the acid and reducing agents) adhering to the pipe wall of the flow path, so that all the fluid delivery flow paths can be flushed most thoroughly. Therefore, the atomic fluorometer with water as the carrier fluid effectively overcomes the memory effect, with improving the sensitivity and accuracy of the determination, and saves a large amount of high-purity HCl and reducing agent NaBH$_4$, which greatly reduces the analysis cost, with the operating environment also significantly being improved.

The present invention will be described in details below by combining drawings with embodiments.

DETAILED DESCRIPTION OF THE INVENTION

The present invention discloses an atomic fluorescence analysis method and an analysis device using water as a carrier fluid. The conventional atomic fluorescence analysis device includes a fluid delivery system, a reactor, an atomizer, an excitation light source, and a detector (see FIG. 1). The fluid delivery system introduces test solution and a reducing agent (reagent) into the reactor, respectively. In the process, hydrochloric acid and reducing agent are used as carrier fluid respectively.

The design concept of the present invention is to use water to replace HCl and reducing agent (reagent) as the carrier fluid in the process of conventional atomic fluorescence analysis to carry fluid into the reactor. After inputting the test solution and the reagent from the liquid inlet capillary tubes to the respective sample storage ring, the pure water is used as carrier fluid by both capillary tubes, and the test solution and reagent in the respective sample storage ring are pushed into the reactor under the water carrier to react. At the same time, the pipeline of the fluid delivery system is cleaned by the pure water used as the carrier fluid.

Figure 1:
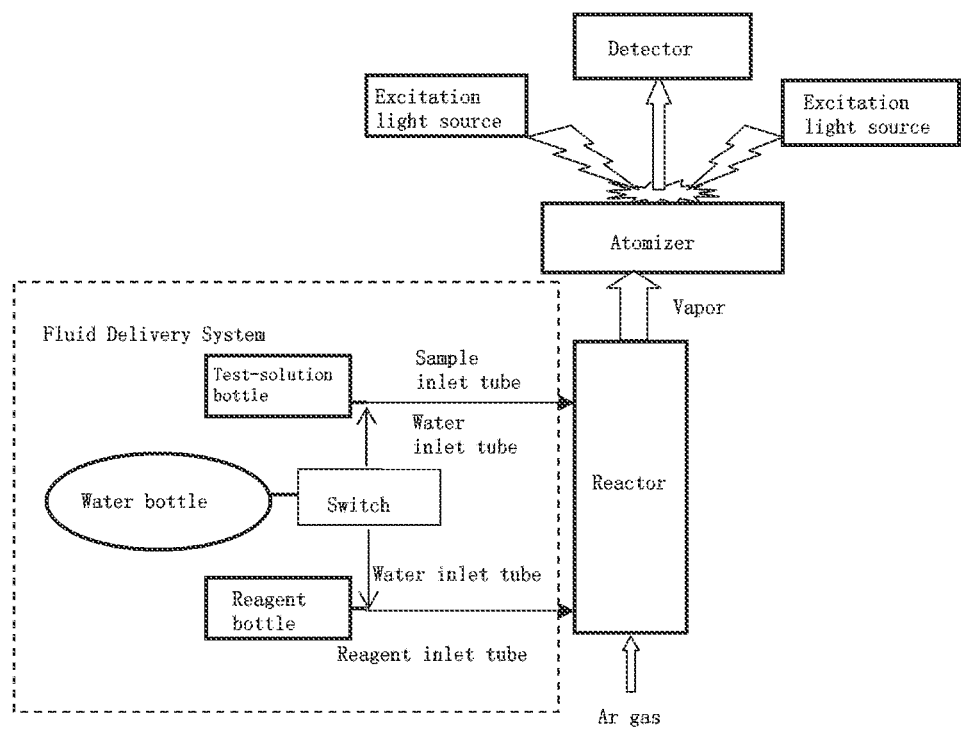
FIG. 1 is a schematic diagram of the structure of the atomic fluorescence analysis device using water as a carrier fluid of the present invention.

Based on the above design concept, as shown in FIG. 1, a schematic structural diagram of the atomic fluorescence analysis device using water as the carrier fluid of the present invention is shown, which mainly includes a fluid delivery system, a reactor, an atomizer, an excitation light source, a detector, etc. The fluid delivery system is used to deliver the test solution (sample solution) and the reducing agent. The test solution and the reducing agent undergo a chemical reaction in the reactor to generate gaseous atoms or hydride molecules and hydrogen (called mixed gas). The atomizer is used to dissociate the hydride molecules into atoms, and the excitation light source and the detector are used to excite fluorescence and collect fluorescence signals, respectively and report the obtained determination results calculated by the obtained fluorescence signal values. The fluid delivery system of the present invention includes: a test solution bottle for containing the sample solution to be tested, which is connected to the reactor through a sample inlet tube; a reagent bottle for containing the reducing agent, which is connected to the reactor through a reagent inlet tube; a water bottle for containing pure water, the outlets of which are connected to the inlet of the sample inlet tube and the inlet of the reagent inlet tube through two water inlet tubes, and a switch is configured to control the water intake from the water inlet tube to the sample inlet tube or the reagent inlet tube. The unique design of the fluid delivery system is that the fluid delivery system does not include a supporting device for injecting hydrochloric acid, which is clearly distinguished and significantly different from the known fluid delivery system. The fluid delivery system, together with a conventional atomic fluorometer including a reactor, an atomizer, an excitation light source, and a detector, constitutes the atomic fluorescence analysis device of the present invention using water as the carrier fluid.

According to the above design concept, in the atomic fluorescence analysis method of the present invention, a test solution with a certain acidity and a reagent with a certain concentration are introduced simultaneously firstly during the working process of the fluid delivery system (sampling), and then the test solution and the reagent is carried into the reactor for reaction by the pure water as the carrier fluid respectively (liquid delivery). An atomizer is used to atomize the vapor after the reaction, and then the excitation light source and the detector are used to excite fluorescence and obtain the fluorescence signal of the test element (determination) so as to calculate the concentration of the test element in the test solution. In the fluid delivery process, hydrochloric acid is not used as the carrier fluid at all, and the pure water is used as the carrier fluid for change, which is significantly different from the known fluid delivery system and beyond conventional imagination.

The relationship between the concentration range of the main elements and the acidity (HCl) determined by the method of the present invention is shown in Table 1 above.

The concentration of the reducing agent $NaBH_4$ (or $KBH_4$) when the main elements are determined by the method of the present invention is shown in Table 2.

TABLE 2

| Concentration of Common Reagent | | | | | | | |
|---|---|---|---|---|---|---|---|
| Elements | As | Sb | Bi | Hg | As-Hg | Pb | Cd |
| $NaBH_4$ (%) | 1 | 1 | 1 | 0.2 | 1 | 2 | 2.5 |

Specifically, in combination with the device shown in FIG. 1, the specific steps of the atomic fluorescence analysis method using water as the carrier fluid can be:

Step 1. Preparing a series of standard solutions with different concentrations of the element to be tested, sample solution and reducing agent (take $NaBH_4$ solution as an example); putting the standard solutions and sample solution into the test solution bottles respectively, and putting the $NaBH_4$ solution into the reagent bottle; putting pure water into water bottle.

Step 2. Making a standard curve: 1) connecting the sample inlet tube to the inlet of the test solution containing the standard blank solution (acid solution with the concentration of the element to be tested is 0), and connecting the reagent inlet tube to the inlet of the reagent bottle, and sampling (the sampling time is 4-5 seconds); 2) switching the sample inlet tube and the reagent inlet tube to connect with the water inlet tube respectively; sucking water into the sample inlet tube and the reagent inlet tube as the carrier fluid, and carrying the standard blank solution and reagent into the reactor through pure water; 3) making the reactor, the atomizer, and the excitation light source work, and making the detector record the blank fluorescence value to complete the determination (the time from carrier fluid to completion of the determination is 8-10 seconds); 4) replacing the test solution bottles containing the series of standard solutions with different concentrations in the order of concentration from low to high; repeating steps 1)-3), and sequentially determining and obtaining the corresponding fluorescence value of each standard solution; 5) drawing a fluorescence value-concentration standard curve.

Step 3. Sample determination: replacing the test solution bottle containing the sample solution; repeating steps 1)-3) in Step 2 to determine and obtain the corresponding fluorescence value of the sample solution, and obtaining concentration value of the determined element to be tested in the sample solution converted by the fluorescence value-concentration standard curve.

Figure 2:
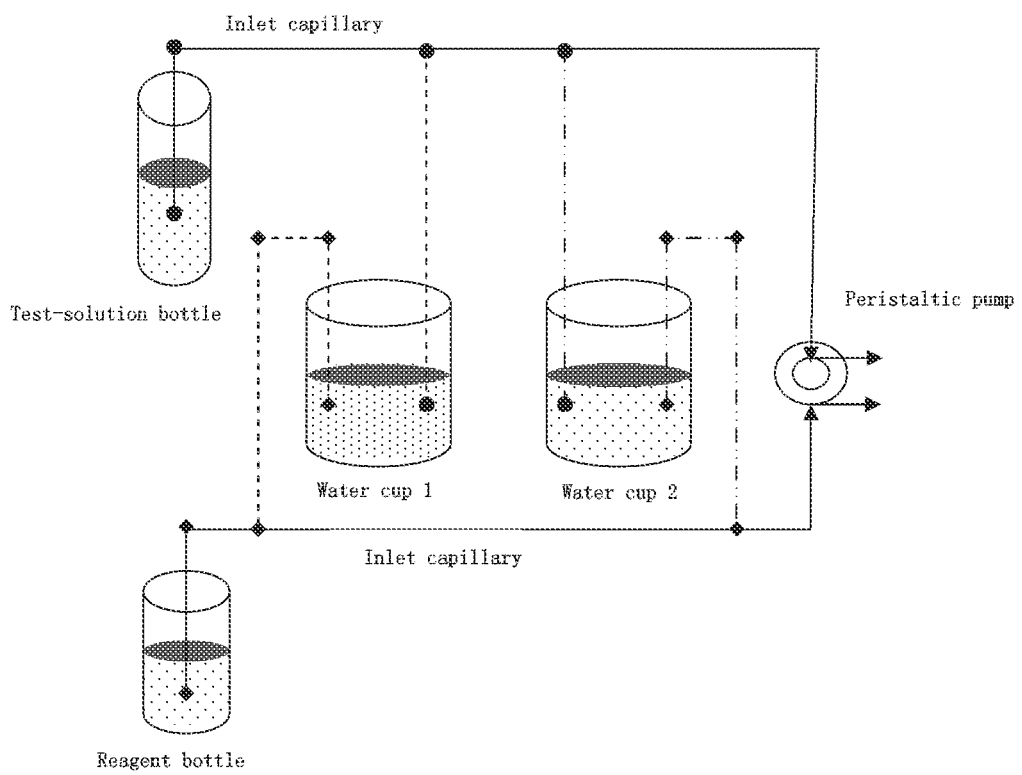
FIG. 2 is a schematic diagram of the simplified fluid delivery system and fluid delivery in the atomic fluorescence analysis device using water as the carrier fluid of the present invention.

FIG. 2 is a simplified fluid delivery system configuration in the atomic fluorescence analysis device using water as the carrier fluid provided by the present invention. The simplified fluid delivery system includes: a test solution bottle for containing the sample solution to be tested and a reagent bottle for containing a reducing agent, the test solution bottle and the reagent bottle are respectively connected to the reactor through a liquid inlet capillary tube; two water bottles for containing pure water, one of which (water cup 1) contains cleaning water for cleaning the two capillary tubes, while the other (water cup 2) of which contains water for carrying as the carrier fluid. A peristaltic pump can be used in the fluid delivery process of atomic fluorescence analysis. The test solution and the reagent are respectively input into the sample storage ring (called "sampling") by two capillary tubes under the action of the peristaltic pump, and then the liquid inlet head ends (free end) of the two capillary tubes are inserted into the cleaning water of water cup 1 for cleaning the solution attached to the outer wall (see the dotted line in FIG. 2), and then the liquid inlet head ends of the two capillary tubes are inserted into the water cup 2 (see the dash-dotted line in FIG. 2, called "replacing insertion"); the test solution and reagent in respective sample storage ring are pushed into the reactor by the carrier water. In the same way, the molecular vapor generated by the chemical reaction enters the atomizer and is atomized, and is excited by the radiation of the excitation light source. The resulting fluorescence signal generated is determined (called "determination") so as to obtain the concentration of the element to be tested in the test solution.

When using the simplified fluid delivery system provided by the present invention for atomic fluorescence analysis, after the test solution and reagent are sampled, the head ends of the two liquid inlet capillary tubes are placed in the water cup 1 immediately for cleaning the solution may be attached to the outer wall, and then placed in the water cup 2. The sampled solution is carried by water until the end of the determination. The specific operations can be:

A1) sampling: inserting the liquid inlet head ends of the two liquid inlet capillary tubes into the test solution (blank solution, standard solution or sample solution) and reagent ($NaBH_4$) solution for sampling respectively, and the peristaltic pump stops working after 4-5 seconds;

A2) replacing insertion: taking out the liquid inlet head ends of the two liquid inlet capillary tubes and placing them in water cup 1 of cleaning water for cleaning, and then transferring them to the water for carrier fluid in water cup 2; and re-initiating the peristaltic pump;

A3) carrier fluid determination: carrying the test solution and the reagent into the reactor by the carrier fluid water, respectively, and then determining the fluorescence signal of the test solution by the instrument.

The time control in this operation is: sampling/delaying/replacing insertion/determination: 4-5/0/2-3/8-10 (seconds). That is, the time of A1) for sucking the test solution and reagent (i.e., sampling) is 4-5 seconds, the operation is delaying after sampling, and the time of the delaying is usually zero second; removing the capillary head ends from the test solution and reagent, and placing them in the cleaning water in the water cup 1 firstly and then transferring them to the carrier fluid water in the water cup 2, that is, the replacing insertion time of A2) is generally 2-3 seconds; the carrier water in the water cup 2 pushes the test solution and reagent in the sample storage ring until the end of the determination, that is, the carrier fluid determination time of A3) is 8-10 seconds, during which the fluorescence signal of the element is determined.

The specific operation of using the above simplified fluid delivery system to support the atomic fluorometer for atomic fluorescence analysis and determination is:

Operation 1. Preparing a series of standard solutions with different concentrations of the element to be tested, sample solution and reducing agent ($NaBH_4$ solution) as required. Then placing two cups of pure water in a sample pan.

Operation 2. Turning on the power of the atomic fluorometer; selecting single-channel or dual-channel on the desktop system's setting page; confirming the required conditions for the test, lightening the light source of the element to be tested and warming up for 5-10 minutes. Opening the Ar gas cylinder valve; adjusting the Ar gas pressure to 0.3 MPA, and opening the exhaust device of the atomizer.

Operation 3. Making a Standard Curve:

1) sampling: inserting the liquid inlet head ends of the two liquid inlet capillary tubes into the standard blank solution and $NaBH_4$ solution respectively; click "Blank" on the desktop standard page; the fluid delivery system automatically executes the sampling program, and the peristaltic pump stops working after sampling for 4-5 seconds;

2) taking out the two capillary head ends immediately and placing them in the cleaning water of water cup 1 for cleaning, and then transferring them to the pure water of the water cup 2 (replacing insertion time is 2-3 seconds), and re-initiating the peristaltic pump;

3) carrying the test solution and the reagent into the reactor by the carrier water in water cup 2, respectively; determining the fluorescence signal of the standard blank solution by the instrument and recording the blank fluorescence value (the time from carrier fluid to the end of the determination is 8-10 seconds);

4) after the blank fluorescence signal is stable, replacing the standard blank solution with a series of standard solutions; repeating the processes of 1)-3), determining the fluorescence signals of the series of standard solutions from low to high concentration and recording the fluorescence values; the curve of the peak value of the fluorescence signal (fluorescence value-time) is generated synchronously;

5) entering the concentration of the standard solutions in the desktop system, and taking the average of the determined fluorescence value of each concentration standard solution to create a fluorescence value-concentration standard curve.

Operation 4. Sample determination: after cleaning the head ends of the liquid inlet capillary tubes inserted into the test solution bottle with clean water; firstly determining the sample blank until it is stable on the sample test page of the desktop system, and replacing the standard blank solution with the sample solution; determining the fluorescence signal of each sample solution in sequence according to 1)-3) in Operation 3; using the fluorescence value of the sample to obtain the concentration of the test element in the sample solution from the fluorescence value-concentration standard curve, and entering the relevant parameters to calculate the content of the tested element in the sample.

The above method can determine a single element or two elements at the same time. When measuring multiple elements, standard mixed solutions of different elements with different concentrations are prepared to make a standard curve of corresponding element. The content of each element to be tested in the sample is determined according to the above steps and operations. The present invention will be further described below in combination with specific examples, while the content listed in the examples and not limitations to the present invention. The concentration "%" in the examples is expressed as a mass percentage concentration.

Test Example 1: Cd Analysis

Test Sample: Rice, Soybeans

Figure 3:
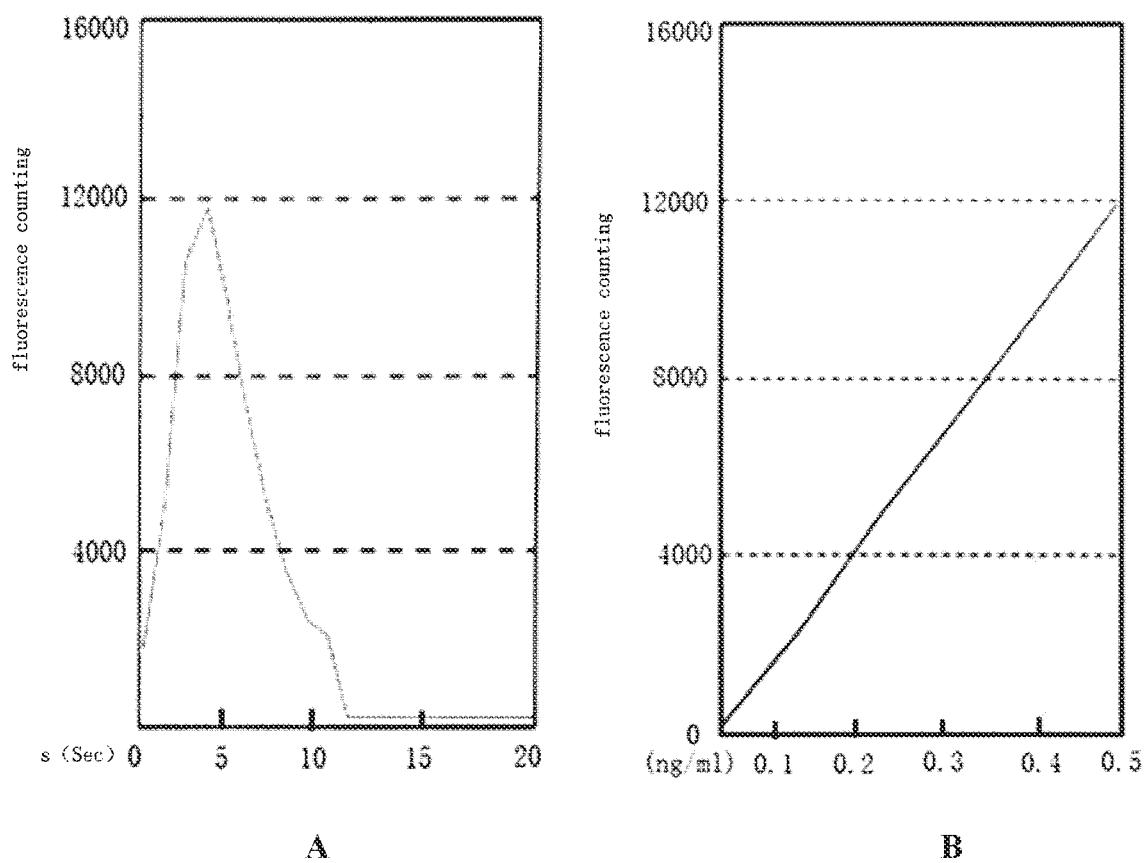
FIG. 3 shows the peak curve (A, fluorescence value-time) and standard curve (B, fluorescence value-concentration) of Cd determined by the atomic fluorescence analysis method using water as the carrier fluid of the present invention in Example 1.

Preparation of cadmium standard curve: firstly a 10 ng/ml cadmium standard solution was prepared; then 0, 0.5, 1.0, 1.5, 2.0 and 2.5 ml of this standard solution was taken into a 50 ml plastic quantitative bottle, respectively; to each plastic quantitative bottle, 4 ml HCl solution with a concentration of 50% and 5 ml thiourea with the concentration of 5% were added, and the resulting solution was diluted to the scale with water to obtain a series of standard solutions with a Cd concentration of 0, 0.1, 0.2, 0.3, 0.4 and 0.5 ng/ml. After shaking, determining the fluorescence signals of the blank and the series of standard solutions according to the operating procedure, and making a standard curve (see FIG. 3, panel B). FIG. 3, panel A shows the peak curve of Cd.

Preparation and Determination of Test Solution:

A sample of rice flour or soybean flour (about 0.1-0.2 g) was weighed and placed into a 50 ml plastic quantitative bottle, to which 4 ml of 50% HCl and 5 ml of 5% thiourea were added; after shaking for 5-10 min, the resulting solution in the plastic quantitative bottle was diluted with water to the scale; then the sample solution was prepared according to the volume in Table 3. According to the operation process, the sample solution was used as the test solution to determine the fluorescence signal of the sample solution, and the concentration of Cd was obtained from the standard curve and converted into the content in the sample. The determination results of Cd in food samples were shown in Table 3.

The time spent in the determination process is reduced by about 50% as compared to a conventional method. NaBH$_4$ solution only needs to be used to participate in the reaction, which saves more than 75% as compared with the conventional determination. The samples in Table 3 are tested sequentially from left to right; it can be seen that the high-concentration solution has no effect on the subsequent determination. It shows that the method of using water as the carrier fluid eliminates the memory effect.

Test Example 2: Simultaneous Determination of Hg/as

Test Sample: Soil

As the content of As in the soil is much higher than Hg, the existing atomic fluorometer has been unable to simultaneously determine Hg and As in such samples. In this example, the device of the present invention is used to realize the simultaneous determination of Hg and As in the same sample.

Preparation of standard curve: a mixed standard solution containing 500 ng/ml As and 10 ng/ml Hg was prepared in advance. 0, 1, 2, 3, 4, and 5 ml of this standard solution was taken respectively into 50 ml plastic quantitative bottles, to each of the plastic quantitative bottle, 5 ml of 5% Vc-5% thiourea solution and 10 ml of 50% concentration HCl were added, and the resulting solution was diluted with water to the scale to obtain Nos. 0-5 series of standard solutions. The Hg concentration sequence in the standard solutions is 0, 0.2, 0.4, 0.6, 0.8 and 1.0 ng/ml, and the As concentration sequence is 0, 10, 20, 30, 40 and 50 ng/ml.

Figure 4:
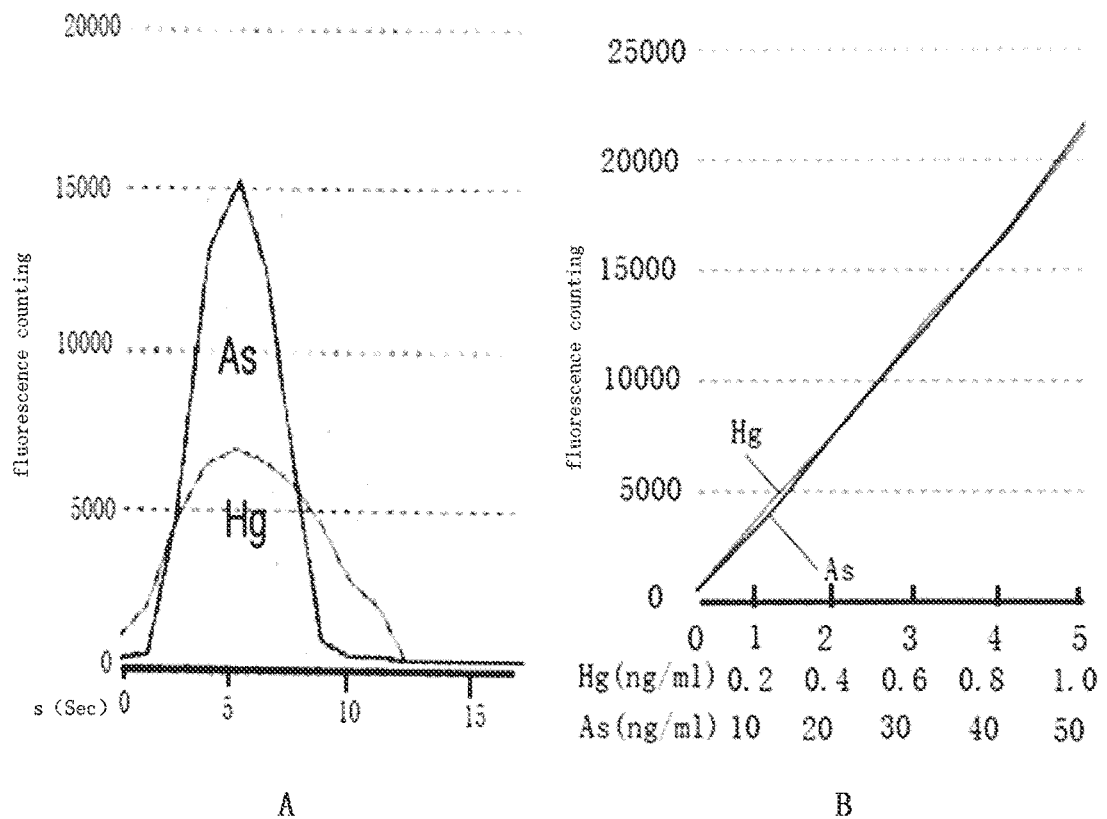
FIG. 4 shows the peak curves of Hg/As (A, fluorescence value-time) and the standard curves of Hg and As of the mixed solution (B, fluorescence value-concentration) simultaneously determined by the atomic fluorescence analysis method using water as the carrier fluid of the present invention in Example 2.

Selecting the dual-channel pattern, determining the fluorescence signals of Hg and As in the blank and the series of standard solutions at the same time according to the above operation process, and making the Hg and As standard curves of the mixed standard solution respectively. Panel A in FIG. 4 is the peak curves of Hg/As; Panel B in FIG. 4 is the standard curves of Hg and As in the mixed standard solution (the signal of the standard curve is calculated based on the spectrum area and the blank area has been subtracted).

TABLE 3

Determination Results of Cd in Rice and Soybean Flour (ng/g)

| NO. | GSS-1 (rice) | | GSS-21 (rice) | | GSS-4(soybean) |
|---|---|---|---|---|---|
| Sample weighing G (g) | 0.1172 | 0.2265 | 0.0915 | 0.2170 | 0.1022 |
| Fluorescence intensity | 1955 | 1889 | 285 | 308 | 153 |
| Concentration(ng/ml) | 0.201 | 0.200 | 0.033 | 0.035 | 0.020 |
| Preparation volume (ml) | 50 | 100 | 50 | 100 | 50 |
| Content (ng/g) | 86 | 88 | 18 | 16 | 10 |
| Recommended content (ng/g) | 87 ± 5 | 87 ± 5 | 18 ± 2 | 18 ± 2 | 11 |

It can be seen from the data in Table 3 that when the HCl concentration is 4%, and even the test sample is not pretreated, it is able to quickly determine the cadmium in rice and other foods by using the atomic fluorescence analysis using water-carrier fluid. Parallel determination values with large differences in sample weighing are almost the same; and the determined Cd content in the sample is consistent with the recommended value.

In this determination operation, the sample does not need digestive treatment, nor requires hydrochloric acid as a carrier fluid, while only pure water (18.2 MΩ) is consumed.

Preparation and determination of test solution: the soil sample (about 0.1-0.2 g) was weighed according to the sample weighing (G), and placed in a 50 ml tetrafluoroethylene sample tube, to which 50% aqua regia was added and the resulting solution was boiled on a water bath to decompose for 1 hour; then transferred to a 50 ml plastic quantitative bottle by water; to the plastic quantitative bottle, 5 ml of 5% Vc-5% thiourea solution and 10 ml of 50% concentration HCl were added; and the resulting solution was diluted to the scale by water; shaking well and using the sample solution as the test solution to determine the fluorescence signals of Hg and As at the same time; obtaining the concentration of the corresponding element according to the respective standard curve and calculating the content of each in the sample. The results were shown in Table 4.

TABLE 4

Simultaneous Determination Results of Hg/As in Soil

| Sample No. | Sample Weighing G (g) | Recommended Content | | Determined Content | |
|---|---|---|---|---|---|
| | | Hg (ng/g) | As (μg/g) | Hg (ng/g) | As (μg/g) |
| GSS-2 | 0.1279 | 15 ± 3 | 13.7 ± 1.2 | 18 | 13.1 |
| GSS-3 | 0.1205 | 60 ± 4 | 4.4 ± 0.6 | 59 | 3.8 |
| GSS-7 | 0.1230 | 61 ± 6 | 4.8 ± 1.3 | 64 | 3.4 |
| GSS-8 | 0.1438 | 17 ± 3 | 12.7 ± 1.1 | 15 | 11.5 |
| GSS-25 | 0.1256 | 43 ± 3 | 12.9 ± 0.5 | 42 | 11.7 |
| GSS-26 | 0.1087 | 30 ± 3 | 8.90 ± 0.5 | 33 | 8.4 |

The data in Table 4 above shows that the method and the device of the present invention solve the difficulty of simultaneously determining Hg and As in the soil. At the same time, it can be seen that the Hg content of the 6 samples (standard samples) varies greatly. According to Table 4, the samples were determined and calculated sequentially from top to bottom, and the results were consistent with the recommended content value, indicating that the determination using the method of the present invention eliminates the severe memory effect of Hg.

In this example, the two elements coexist in the test solution. The delivery system only needs to complete one test solution delivery. The two-element detector can complete the determination at one time. In this determination operation, water is used as the carrier fluid and no hydrochloric acid is needed. Only 100 ml-250 ml of $NaBH_4$ solution is needed to participate in the reaction, thus the time and cost of the entire determination process are greatly reduced.

Test Example 3: Analysis of Hg in Associated Uranium Ore

Test Sample: Associated Uranium Minerals

This example uses the atomic fluorescence analysis device with water as the carrier fluid shown in FIG. 1 (the fluid delivery system is shown in FIG. 2).

Figure 5:
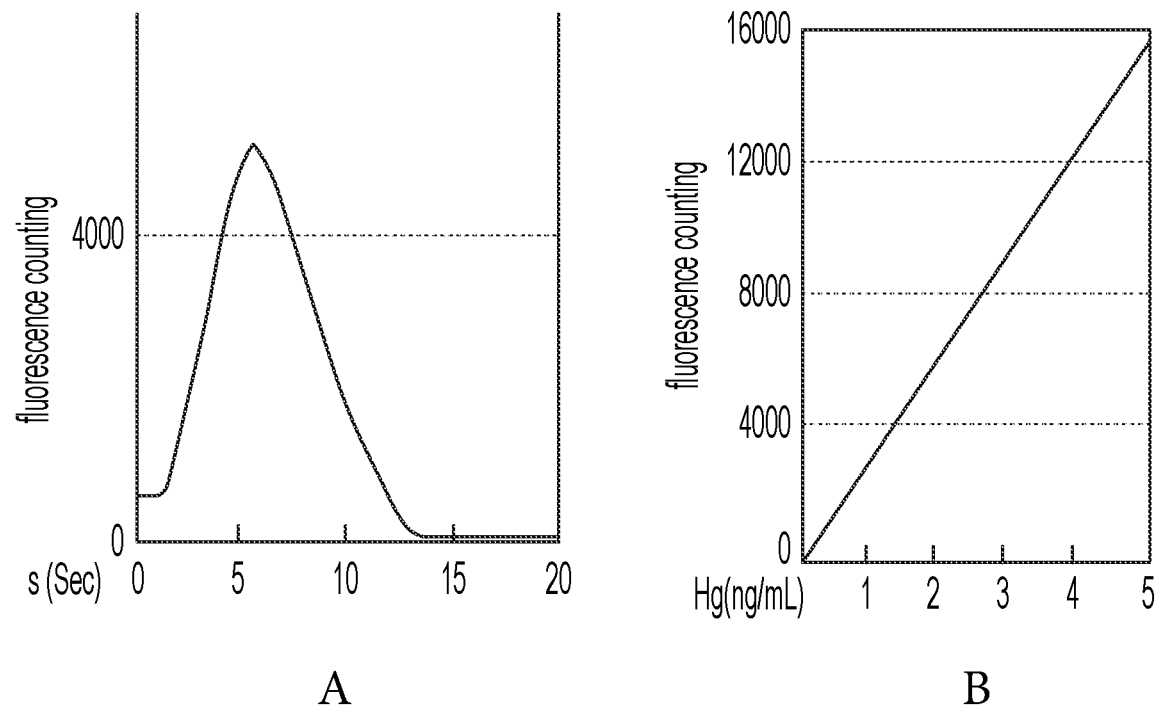
FIG. 5 shows the peak curve (A, fluorescence value-time) and standard curve (B, fluorescence value-concentration) of Hg in the associated uranium ore determined by the atomic fluorescence analysis method using water as the carrier fluid of the present invention in Example 3.

Preparation of mercury standard curve: firstly a mercury standard solution of 50 ng/ml Hg was prepared. 0, 1, 2, 3, 4, and 5 ml of this standard solution was taken in a 50 ml plastic quantitative bottle, respectively; to each of the plastic quantitative bottle, 5 ml of HCl with a concentration of 50% was added and the resulting solution was diluted to the scale by water. The Hg concentration in the series of standard solutions obtained is 0, 1, 2, 3, 4 and 5 ng/ml. Determining the fluorescence signals of the blank and the series of standard solutions according to the operation process. The peak curve of Hg is shown in panel A of FIG. 5, and a signal spectrum similar to Gaussian distribution is obtained. Making a fluorescent signal-concentration standard curve based on the fluorescent signal of the standard solution (see Panel B in FIG. 5).

Weighing the same samples (about 0.1-0.2 g) and placing them in a 50 ml tetrafluoroethylene sample tube, respectively; to each of the tetrafluoroethylene sample tube 50% aqua regia was added and the resulting solution was boiled on a water bath to decompose for 1 hour; then transferred to a 50 ml centrifuge tube by water; to which 5 ml of 50% concentration HCl was added, and the resulting solution was diluted to the scale by water; shaking well and using the sample solution as the test solution to determine the fluorescence signals of the sample solution according to the operation process. In view of the high Hg concentration of the standard solution of 5 ng/ml, the sample inlet capillary tube can be cleaned by clean water before inserted into the sample solution to completely remove the residual mercury in the capillary tube. The Hg concentration is obtained from the standard curve and converted to the Hg content in the sample. The determination results of Hg in the sample were shown in Table 5.

TABLE 5

Determination Results of Hg in Ore

| G (g) | Fluorescence intensity | Concentration (ng/ml) | Volume of Test Solution (ml) | Content of Samples (μg/g) |
|---|---|---|---|---|
| 0.1161 | 5046 | 1.699 | 50 | 0.528 |
| 0.2357 | 7264 | 2.447 | 50 | 0.521 |
| 0.1846 | 5645 | 1.901 | 50 | 0.517 |
| 0.1940 | 6038 | 2.033 | 50 | 0.524 |

It can be seen from the data in Table 5 that when the sample weighting (G) varies greatly and the HCl concentration is 5%, the atomic fluorescence analysis using water as the carrier fluid can quickly determine the content of Hg in the ore. The determined Hg content in parallel samples is almost the same, and it is consistent with the comparison results of many laboratories. In this determination operation, the sample does not need to be digested, nor requires hydrochloric acid as carrier fluid; only pure water (18.2 MΩ) is consumed, and the time spent in the determination process is reduced by about 50% as compared with conventional methods; $NaBH_4$ solution only needs to be used to participate in the reaction, which saves more than 75% as compared with the conventional determination. The sample weighing in the table is random. It can be seen that the concentration of mercury in the solution is high or low, and the determination can be completed and consistent results can be obtained. It can be seen that the use of water as the carrier fluid eliminates the memory effect. Even after the high concentration standard solution is determined, because the fluid delivery system is cleaned by the carrier water, the determination of other concentration sample solutions will not be affected.

Table 6 lists the detection limit and reproducibility data of mercury, which shows that the method and the device of the present invention have good detection stability.

TABLE 6

Hg Detection Limit and Reproducibility Data Table
A Channel-performance index detection

| Element Detection Limit DL | | Working Manners Reproductivity RSD | |
|---|---|---|---|
| Eliminate | Fluorescence value | Eliminate | Net fluorescence |
| 1 | 882 | 1 | 1173 |
| 2 | 886 | 2 | 1167 |
| 3 | 886 | 3 | 1165 |
| 4 | 885 | 4 | 1182 |
| 5 | 882 | 5 | 1168 |
| 6 | 887 | 6 | 1171 |
| 7 | 883 | 7 | 1167 |
| 8 | 887 | A Channel | 1901.6 |

TABLE 6-continued

Hg Detection Limit and Reproducibility Data Table
A Channel-performance index detection

| Element | Mercury Detection Limit DL | Working Manners Reproductivity RSD | |
|---|---|---|---|
| Eliminate | Fluorescence value | Eliminate | Net fluorescence |
| 9 | 887 | Sensitivity | |
| 10 | 887 | DL-δ | 2.0226 |
| 11 | 884 | RSD-δ | 5.7694 |
| DL | 0.0032 | RSD | 0.4934 |

INDUSTRIAL APPLICABILITY

The present invention provides an atomic fluorescence analysis method and a device using water as a carrier fluid. In a conventional fluid delivery process, hydrochloric acid and a reducing agent are replaced with water as a carrier fluid, so that the test solution and reducing agent are carried into a reactor by water to complete the reaction. It effectively overcomes the memory effect, which improves the sensitivity and accuracy of the determination, and saves a large amount of high-purity hydrochloric acid and reducing agent, greatly reduces the analysis cost; the operating environment is significantly improved, making it suitable for industrial applications.

The invention claimed is:

1. An atomic fluorescence analysis method comprising:
   taking a test solution containing an element to be tested and a reducing agent, respectively;
   using water as a carrier fluid to carry the test solution and the reducing agent respectively into a reactor;
   generating, in the reactor, a vapor containing the element to be tested;
   atomizing the element to be tested in the vapor in an atomizer; and
   determining the fluorescence signal of the element to be tested.

2. The atomic fluorescence analysis method according to claim 1, wherein the time of taking the test solution and the reducing agent is 4-5 seconds, and the time from the step of using water to carry the test solution and the reducing agent respectively into the reactor to the step of determining the fluorescence signal of the element to be tested is 8-10 seconds.

3. The atomic fluorescence analysis method according to claim 1, wherein the element to be tested is:
   As, and acidity of the test solution is 10%, or
   Sb, and acidity of the test solution is 10%, or
   Bi, and acidity of the test solution is 10%, or
   Se, and acidity of the test solution is 10%, or
   Hg, and acidity of the test solution is 5-10%, or
   Pb, and acidity of the test solution is 10%, or
   Cd, and acidity of the test solution is 4%.

4. The atomic fluorescence analysis method according to claim 1, wherein the method uses an atomic fluorescence analysis device, which comprises: a fluid delivery system, a reactor, an atomizer, an excitation light source, and a detector, wherein the fluid delivery system comprises:
   a test solution bottle for containing the test solution, which test solution bottle is connected to the reactor through a sample inlet tube;
   a reagent bottle for containing the reducing agent, which reagent bottle is connected to the reactor through a reagent inlet tube;
   a water bottle for containing the water, the water bottle connected to an inlet of the sample inlet tube and to an inlet of the reagent inlet tube through two water inlet tubes, and
   a switch configured to control the water intake from the water inlet tubes to the sample inlet tube or the reagent inlet tube.

5. The atomic fluorescence analysis method according to claim 4, the method comprising:
   step 1. Preparing a blank solution a series of standard solutions each with different concentrations of an element to be tested, a sample solution, a reducing agent, and water, wherein the reducing agent is put into the reagent bottle; and water is put into the water bottle;
   step 2. making a standard curve:
   1) sampling: putting the blank solution into the test solution bottle and connecting the sample inlet tube to the inlet of the test solution bottle, and connecting the reagent inlet tube to the inlet of the reagent bottle;
   2) fluid delivery: turning on the switch to connect the sample inlet tube and the reagent inlet tube with the water inlet tube to make the water in the water bottle enter the sample inlet tube and the reagent inlet tube, and to carry and push the blank solution and the reducing agent into the reactor respectively;
   3) determining: making the reactor, the atomizer, and the excitation light source work and obtaining a blank fluorescence value by the detector;
   4) obtaining the fluorescence value of each standard solution in the series of standard solutions by repeating 1)-3) above with the difference being in replacing the blank solution with the series of standard solutions in the order of concentration from low to high;
   5) drawing the standard curve with element concentrations on the X-axis and fluorescence value on the Y-axis;
   step 3. sample determination: obtaining the fluorescence value of the sample solution by repeating 1)-3) of step 2 above with the difference being in replacing the blank solution with the sample solution; and obtaining the concentration of the element to be tested in the sample solution via the standard curve.

6. The atomic fluorescence analysis method according to claim 5, wherein the sampling time in step 1) is 4-5 seconds; the time from the fluid delivery in step 2) to obtaining the fluorescence value by the detector in step 3) is 8-10 seconds.

7. The atomic fluorescence analysis method according to claim 1, wherein the method uses an atomic fluorescence analysis device, which comprises: a fluid delivery system, a reactor, an atomizer, an excitation light source, and a detector, wherein the fluid delivery system comprises:
   a test solution bottle for containing a test solution, which is connected to the reactor through a first liquid inlet capillary tube;
   a reagent bottle for containing the reducing agent, which is connected to the reactor through a second liquid inlet capillary tube;
   two water cups, one of the water cups used for containing water for cleaning, the other used for containing water for carrier fluid, and the liquid inlet head end of each liquid inlet capillary tube is configured to be alternately inserted into the water in the two water cups.

8. The atomic fluorescence analysis method according to claim 7, wherein the two liquid inlet capillary tubes are connected to the reactor through a peristaltic pump, and the peristaltic pump controls the delivery speed and delivery volume of the test solution, reducing agent, and water for carrier fluid in the liquid inlet capillary tubes.

9. The atomic fluorescence analysis method according to claim 8, the method comprising:

operation 1. Preparing a blank solution a series of standard solutions with different concentrations of element to be tested, a sample solution, and a reducing agent as required, and preparing two cups of water;

operation 2. initiating an atomic fluorometer and adjusting the atomic fluorometer to the required working state;

operation 3. making a standard curve:
- A1) sampling: inserting the liquid inlet ends of the liquid inlet capillary tubes into the blank solution and the reducing agent for sampling respectively, and after 4-5 seconds stopping the peristaltic pump;
- A2) replacing insertion: taking out the liquid inlet ends of the liquid inlet capillary tubes and placing them in a cup of cleaning water for cleaning, and then transferring them to the water for carrier fluid in the other cup; and re-initiating the peristaltic pump;
- A3) carrier fluid determination: carrying the blank solution and the reducing agent into the reactor by the carrier fluid, respectively, and obtaining the blank fluorescence value by the detector;
- A4) obtaining the fluorescence value of each standard solution by repeating A1)-A3) above with the difference being in replacing the blank solution with the series of standard solutions in the order of concentration from low to high;
- A5) drawing the standard curve with element concentrations on the X-axis and fluorescence value on the Y-axis;

operation 4. sample determination: obtaining the fluorescence value of the sample solution by repeating A1)-A3) above with the difference being in that the blank solution has been replaced with the sample solution, obtaining the concentration of the element to be tested in the sample solution from the standard curve, and entering the relevant parameters to calculate the content of the element in the sample.

10. The atomic fluorescence analysis method according to claim 9, wherein the sampling time in A1) is 4-5 seconds, the delaying time is zero seconds, the replacing insertion time in A2) is 2-3, and the carrier fluid determination time in A3) is 8-10 seconds, wherein the delaying is an operation after the sampling.

* * * * *